United States Patent
Kitaura et al.

(10) Patent No.: US 8,035,683 B2
(45) Date of Patent: Oct. 11, 2011

(54) STEREOSCOPIC IMAGE REPRODUCING APPARATUS AND STEREOSCOPIC IMAGE REPRODUCING METHOD

(75) Inventors: Ryuji Kitaura, Chiba (JP); Kazuto Ohhara, Chiba (JP); Toshio Nomura, Tokyo (JP); Naoki Ishihara, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1438 days.

(21) Appl. No.: 10/567,521

(22) PCT Filed: Jul. 16, 2004

(86) PCT No.: PCT/JP2004/010203
§ 371 (c)(1), (2), (4) Date: Feb. 6, 2006

(87) PCT Pub. No.: WO2005/020591
PCT Pub. Date: Mar. 3, 2005

(65) Prior Publication Data
US 2006/0290778 A1 Dec. 28, 2006

(30) Foreign Application Priority Data
Aug. 26, 2003 (JP) .................. 2003-301471

(51) Int. Cl.
H04N 13/04 (2006.01)
(52) U.S. Cl. ........................................................ 348/51
(58) Field of Classification Search ................ 348/47, 348/51–60
See application file for complete search history.

(56) References Cited

U.S. PATENT DOCUMENTS
2001/0033327 A1* 10/2001 Uomori et al. ................. 348/47

FOREIGN PATENT DOCUMENTS
| JP | 08-009421 | 1/1996 |
| JP | 08-317429 | 11/1996 |
| JP | 09-121370 | 5/1997 |
| JP | 10-150608 | 6/1998 |
| JP | 2000-224612 | 8/2000 |

OTHER PUBLICATIONS
Machine Translation of JP 10-150608, Murata, Jun. 2, 1998.*

* cited by examiner

*Primary Examiner* — David Ometz
*Assistant Examiner* — Dillon Durnford Geszvain
(74) *Attorney, Agent, or Firm* — Edwards Angell Palmer & Dodge LLP; David G. Conlin; David A. Tucker

(57) ABSTRACT

When three-dimensional images are displayed on various display apparatuses, the images are displayed in a state that allows for stereoscopic vision even if the size of the display apparatus is large or even if the resolution of the display apparatus is low.

The apparatus includes: a decision means for deciding based on the standard information contained in the control information whether the amount of parallax on the display screen when three-dimensional image data is displayed is greater than the amount of parallax on the optimal display apparatus for displaying the three-dimensional image data; and an image processing means for implementing an image process for changing the amount of parallax, and adjusts the amount of parallax of three-dimensional images in accordance with the ratio between the pitch between dots of the standard display apparatus for displaying three-dimensional images and the pitch between dots of an own terminal.

22 Claims, 8 Drawing Sheets

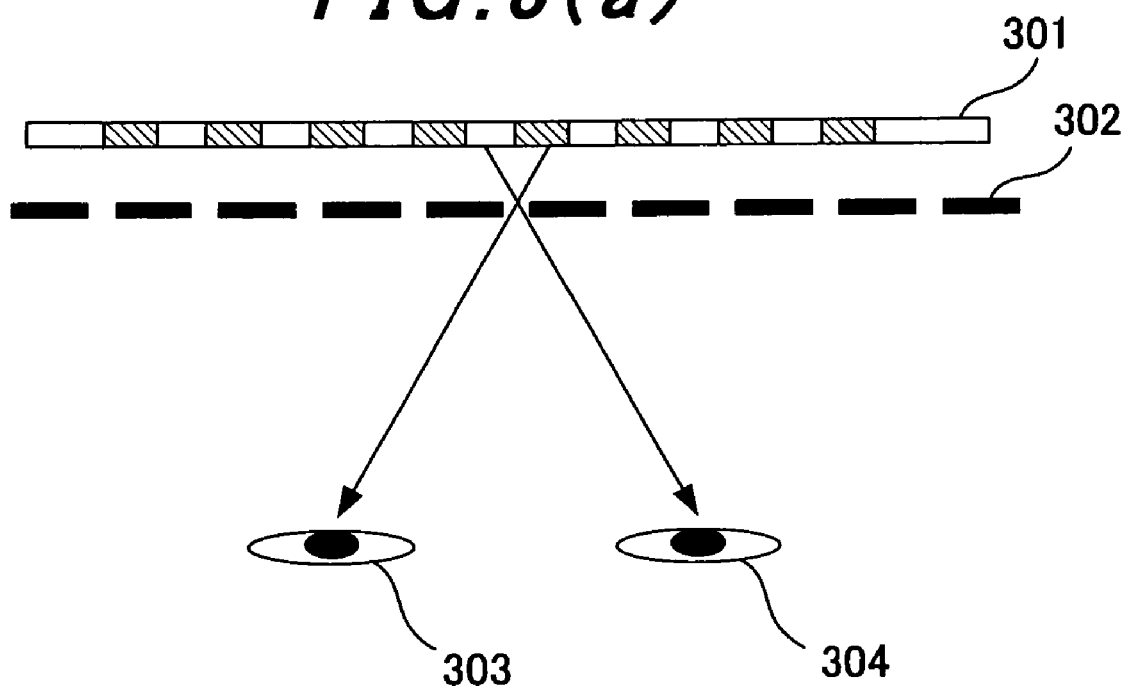
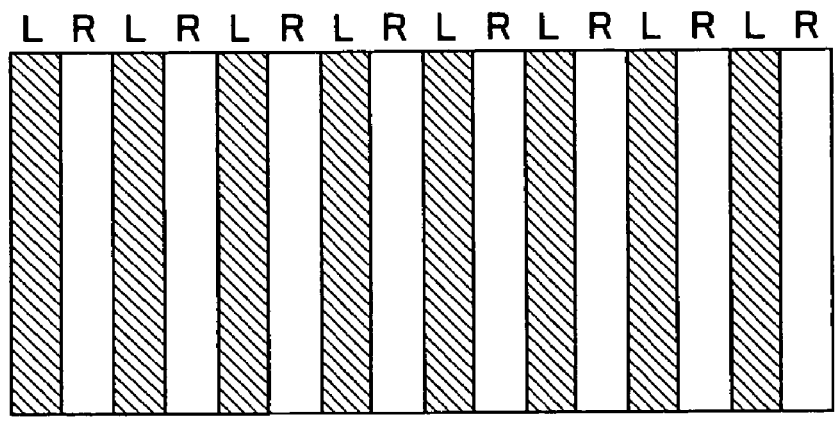

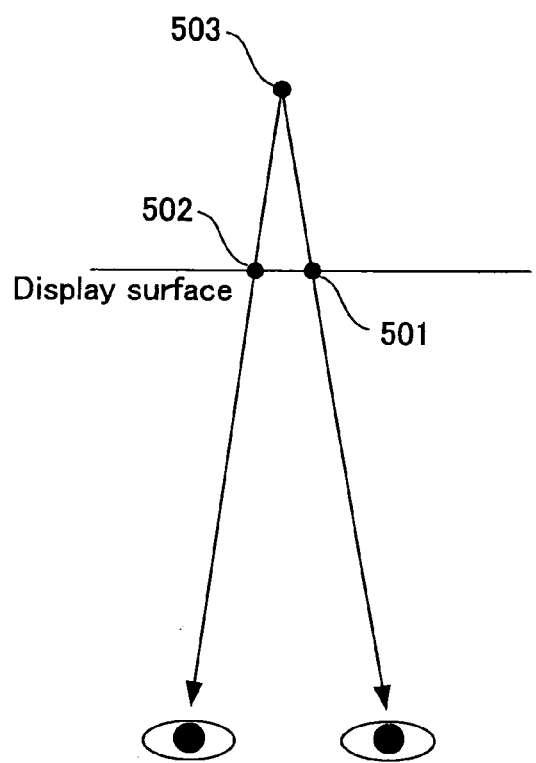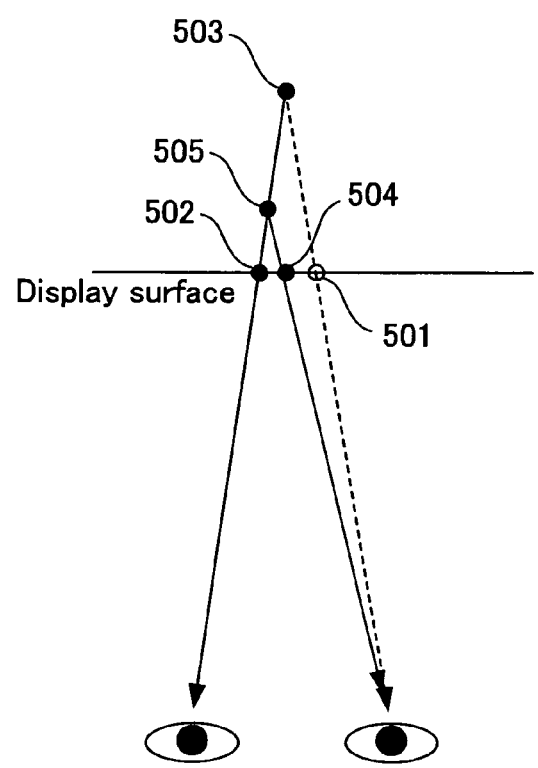

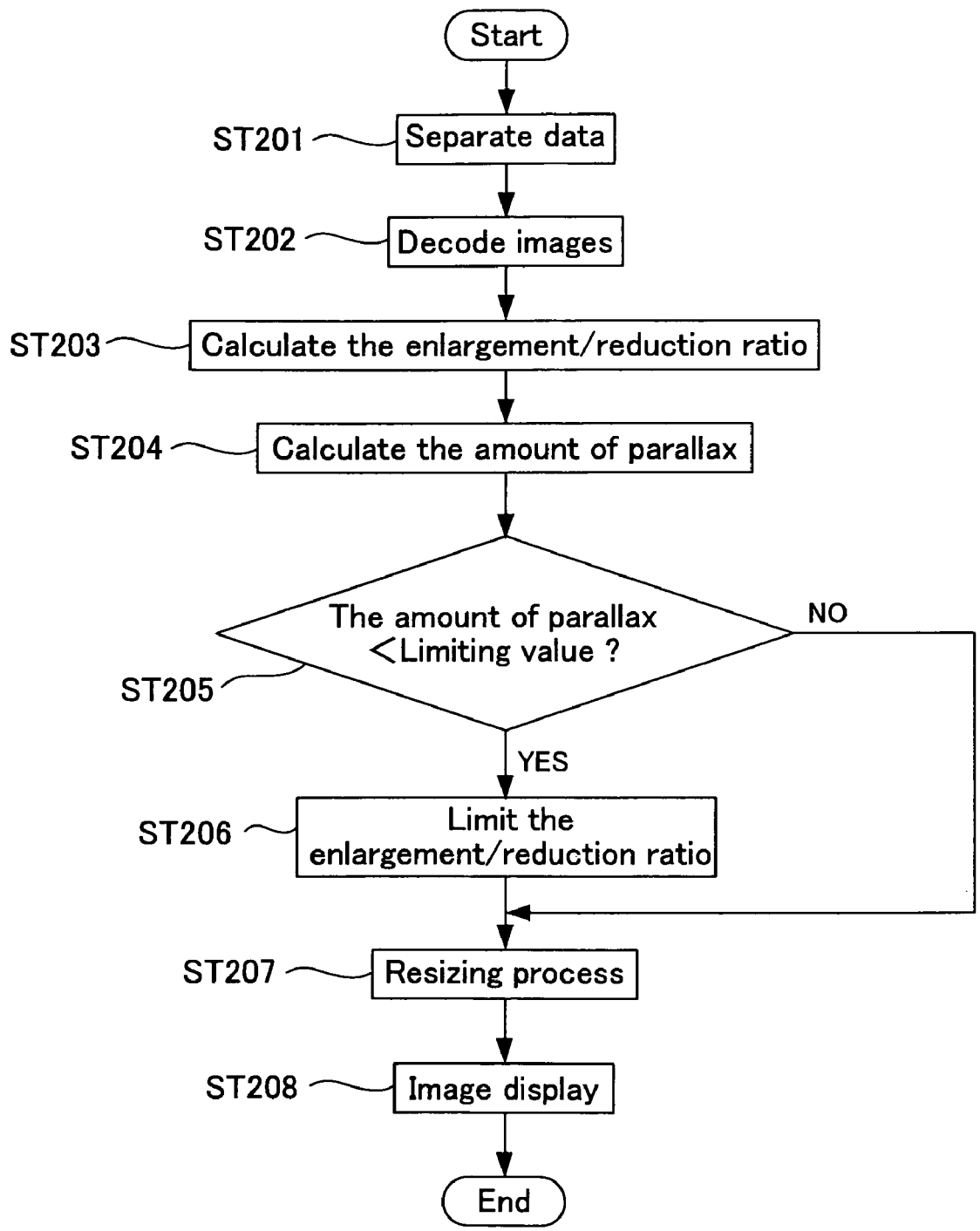

DS: Display apparatus size
IS: Displayed image size

STEREOSCOPIC IMAGE REPRODUCING APPARATUS AND STEREOSCOPIC IMAGE REPRODUCING METHOD

TECHNICAL FIELD

The present invention relates to a stereoscopic image reproducing apparatus and stereoscopic image reproducing method for reproducing three-dimensional images so as to be able to provide stereoscopic vision.

BACKGROUND ART

Conventionally, various methods for displaying three-dimensional images have been proposed. Of these, "binocular methods" using binocular parallax are generally used. Specifically, a stereoscopic vision can be achieved by providing left and right-eye images having binocular parallax and projecting them separately on the left and right eyes, respectively. In the observation of three-dimensional images of this kind, the obtained stereoscopic effect depends on the magnitude of the binocular parallax (to be called "the amount of parallax"). Accordingly, if stereographs of an identical three-dimensional image are displayed in different sizes on screen, the resultant visions become different because of the change in the amount of parallax. That is, even when an identical display apparatus is used, the amount of parallax becomes greater if the display size of the image is enlarged. Further, on different display apparatuses, there occur cases where the amount of parallax becomes greater if the image is displayed on the display apparatus having a greater size.

FIG. 7 shows this situation, where w<W. In the case where, as shown in FIG. 7(a), a right-eye image 701 and a left-eye image 702 fuse into a stereoscopic image at a position 703, if the display size of the image becomes greater as shown in FIG. 7(b), the amount of parallax w in the case shown in FIG. 7(a) becomes greater and equal to W. As W becomes too large, it is impossible to see a stereoscopic view with both eyes. If the image is magnified by an image process, it is possible to predict the possibility of incapability of reproducing a stereoscopic vision because the magnification is done by the process on the terminal side. However, if the image is enlarged due to difference in the specifications between display apparatuses, there has been the problem that the situation cannot be correctly grasped.

In order to solve the above problems, a patent literature 1 has disclosed a technology in which three-dimensional image data is received together with information as to the size of the display apparatus that can produce a preferable stereoscopic effect if the three-dimensional images are supplied as they are, and the amount of parallax of the three-dimensional images is modified so that a preferred stereoscopic effect can be obtained in the user terminal display.

Patent literature 1: Japanese Patent Application Laid-open Hei 10-150608.

DISCLOSURE OF INVENTION

The Problem to be Solved by the Invention

In the above prior art, however, there is the problem that an account is only taken of the case where only the size is different between individual display apparatuses but no account is taken of the case where the resolution is different.

FIG. 8 shows examples of display apparatuses different in size and resolution. The display apparatus shown in FIG. 8(a) and the display apparatus shown in FIG. 8(b) are different in size but are the same in resolution. The display apparatus shown in FIG. 8(b) and that of FIG. 8(c) are the same in size but are the different in resolution. In the drawings, the broken lines represent the boundaries between dots. In FIGS. 8(a) and 8(b), the image is displayed full-screen, and FIG. 8(c) shows a state where the image is displayed in the central portion.

Comparing the display apparatus shown in FIG. 8(a) with the display apparatus shown in FIG. 8(b), when the size of the display apparatus becomes greater without change in resolution, the displayed image is expanded spatially because the distance between dots of the display apparatus is made greater. However, when the resolution becomes higher correspondingly to the size as seen in the display apparatus shown in FIG. 8(a) and the display apparatus shown in FIG. 8(c), the display size of the image does not always become greater.

Further, when the resolution becomes lower with the size of the display apparatus unvaried, the magnified image is displayed, so that the amount of parallax becomes greater. In the above ways, it is not sufficient to take only the size of the display apparatus into account.

The present invention has been devised to solve the problems described above, it is therefore an object of the present invention to provide a stereoscopic image reproducing apparatus and stereoscopic image reproducing method whereby three-dimensional images are displayed so as to be able to provide stereoscopic vision, in conformity with the size and resolution of the display apparatus.

The Means for Solving the Problems

The stereoscopic image reproducing apparatus according to the present invention is a stereoscopic image reproducing apparatus for reproducing a three-dimensional image based on control information for controlling a display of three-dimensional image data, including: a decision means for deciding based on the control information whether an amount of parallax on a display screen when the three-dimensional image data is displayed is greater than an amount of parallax on a display screen when the three-dimensional image data is displayed on a standard display apparatus; and an image processing means for implementing an image process for changing the amount of parallax, and is characterized in that when the decision means determines that the amount of parallax will be greater, the image process by the image processing means is implemented.

Preferably, the apparatus is characterized in that the image processing means includes a parallax quantity adjusting means for adjusting the amount of parallax by horizontally shifting an image from a predetermined viewpoint which constitutes the three-dimensional image data.

Preferably, the apparatus is characterized in that the image processing means includes a resizing means for changing an image size.

Preferably, the apparatus is characterized in that the control information contains information as to a resolving power of the standard display apparatus.

Preferably, the apparatus is characterized in that the control information contains information as to a display size when the three-dimensional image data is displayed on the standard display apparatus.

The stereoscopic image reproducing apparatus according to the present invention is a stereoscopic image reproducing apparatus for reproducing a three-dimensional image based on control information for controlling a display of three-dimensional image data, comprising: a decision means for deciding based on the control information whether an amount of parallax on a display screen when the three-dimensional image data is displayed is a value that allows for stereoscopic vision; and a resizing means for changing an image size of the three-dimensional image data, is characterized in that when the decision means determines that the amount is a value that will not allow for stereoscopic vision, the enlargement and reduction ratio is limited.

Preferably, the apparatus is characterized in that the control information contains parallax information representing an amount of parallax of the three-dimensional image data including an amount of parallax of a subject of importance.

The stereoscopic image reproducing method according to the present invention is a stereoscopic image reproducing method for reproducing a three-dimensional image based on control information for controlling a display of three-dimensional image data, comprising: a decision step for deciding based on the control information whether an amount of parallax on a display screen when the three-dimensional image data is displayed is greater than an amount of parallax on a display screen when the three-dimensional image data is displayed on a standard display apparatus; and an image processing step for implementing an image process for changing the amount of parallax, and is characterized in that when the decision step determines that the amount of parallax will be greater, the image process by the image processing step is implemented.

Preferably, the method is characterized in that the image processing step includes adjustment of the amount of parallax by horizontally shifting an image from a predetermined viewpoint which constitutes the three-dimensional image data.

Preferably, the method is characterized in that the image processing step includes resizing of an image size of the three-dimensional image data.

Preferably, the method is characterized in that the control information contains information as to a resolving power of the standard display apparatus.

Preferably, the method is characterized in that the control information contains information as to a display size when the three-dimensional image data is displayed on the standard display apparatus.

A stereoscopic image reproducing method for reproducing a three-dimensional image based on control information for controlling a display of three-dimensional image data, includes a step of changing a image size of the three-dimensional image data by limiting an enlargement/reduction ratio in accordance with the control information so that the amount of parallax on a display screen when the three-dimensional image data is displayed will be a value that allows for stereoscopic vision.

The stereoscopic image reproducing method according to the present invention is a stereoscopic image reproducing method for reproducing a three-dimensional image based on control information for controlling a display of three-dimensional image data, comprising: a decision step for deciding based on the control information whether an amount of parallax on a display screen when the three-dimensional image data is displayed is a value that allows for stereoscopic vision; and a resizing step for changing an image size of the three-dimensional image data, is characterized in that when the decision means determines that the amount is a value that will not allow for stereoscopic vision, the enlargement and reduction ratio is limited.

Preferably, the method is characterized in that the control information contains parallax information representing an amount of parallax of the three-dimensional image data including an amount of parallax of a subject of importance.

ADVANTAGE OF THE INVENTION

According to the present invention, in a case where the three-dimensional image data is displayed on different display apparatuses, if the amount of parallax on the display screen when the three-dimensional image data is displayed is greater than the amount of parallax in the display apparatus optimal for displaying the three-dimensional image data, it is possible to provide the advantage of solving the problem that the three-dimensional image is displayed in a state that will not allow for stereoscopic vision, by adjusting the amount of parallax of the three-dimensional image.

Further, according to the present invention, it is possible to provide the advantage of solving the problem that the amount of parallax exceeds the limiting value and the three-dimensional image is displayed in a state that will not allow for stereoscopic vision, by limiting the enlargement/reduction ratio of the image, in accordance with the amount of parallax displayed on the screen of the display apparatus and the display size of the actual image.

BRIEF DESCRIPTION OF DRAWINGS

FIG. 3 is a diagram for illustrating a display apparatus of a parallax barrier type.

FIG. 5 is an illustration for explaining the process of adjustment of the amount of parallax.

FIG. 6 is a chart showing the flow of the process of a stereoscopic image reproducing apparatus of the second embodiment of the present invention.

DESCRIPTION OF THE REFERENCE NUMERALS

Figure 1:
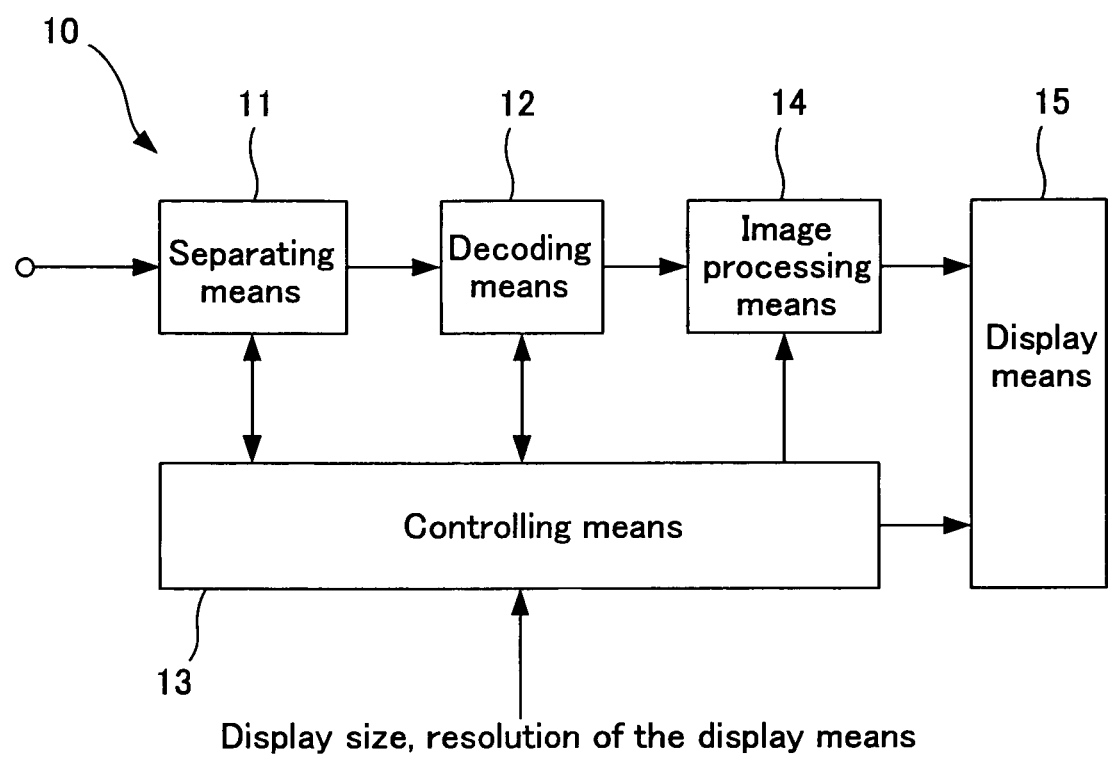
FIG. 1 is a block diagram showing a configurational example of a stereoscopic image reproducing apparatus according to the first embodiment of the present invention.

10 stereoscopic image reproducing apparatus
11 separating means
12 decoding means
13 controlling means (decision means)
14 image processing means
15 display means
141 resizing means
142 parallax quantity adjusting means
143 display image generating means
301 image display panel
302 parallax barrier
303 left eye
304 right eye
501 displayed position
502 displayed position
503 position
504 displayed position
505 position
701 right-eye image
702 left-eye image
703 position

BEST MODE FOR CARRYING OUT THE INVENTION

The best mode for carrying out the present invention will be described with reference to the drawings.

The First Embodiment

FIG. 1 is a block diagram showing a configurational example of a stereoscopic image reproducing apparatus according to the first embodiment of the present invention. In FIG. 1, a stereoscopic image reproducing apparatus 10 is composed of a separating means 11, a decoding means 12, a control means 13 (decision means), an image processing means 14 and a display means 15. Though not illustrated, separating means 11 is connected to a means for reading data from recording media and/or a means for receiving data via communication lines.

Separating means 11 separates multiplexed data having a plurality of kinds of data including image data, audio data, control information, etc., multiplexed in a predetermined scheme, into multiple pieces of constituent data. As the multiplexing scheme, the transport stream specified by MPEG-2 and the like are known. Here, image data and control information may be input separately without using separating means 11.

The control information contains information indicating the fact that the image data is for three-dimensional images and standard information. The standard information is information, based on which change of the amount of parallax is determined. In this case, the standard information is the information as to the resolving power of the standard display that provides a preferable stereoscopic effect when the three-dimensional images are displayed as they are (the display size and resolution, which will be referred to hereinbelow as standard display size and standard resolution).

Decoding means 12 decodes the image data having been encoded based on a predetermined scheme. Generally, upon transmission or recording of image data, the data is coded in order to compress the amount of data. As coding schemes for moving pictures, MPEG-2 video, MPEG-4 video, Motion-JPEG and the like are known. As coding schemes for still pictures, JPEG and the like are known.

Control means 13 controls every means based on the control information etc., so as to reproduce image data correctly. Control means 13 receives the display size and resolution of display means 15. Change of the size of the three-dimensional image data, adjustment of the amount of parallax and the like when display means 15 is changed to one having different display size and/or resolution, will be detailed later. The display size and resolution have been previously determined when display means 15 is fixed to the stereoscopic image reproducing apparatus, but may be designated by the user if an external display is connected.

Figure 2:
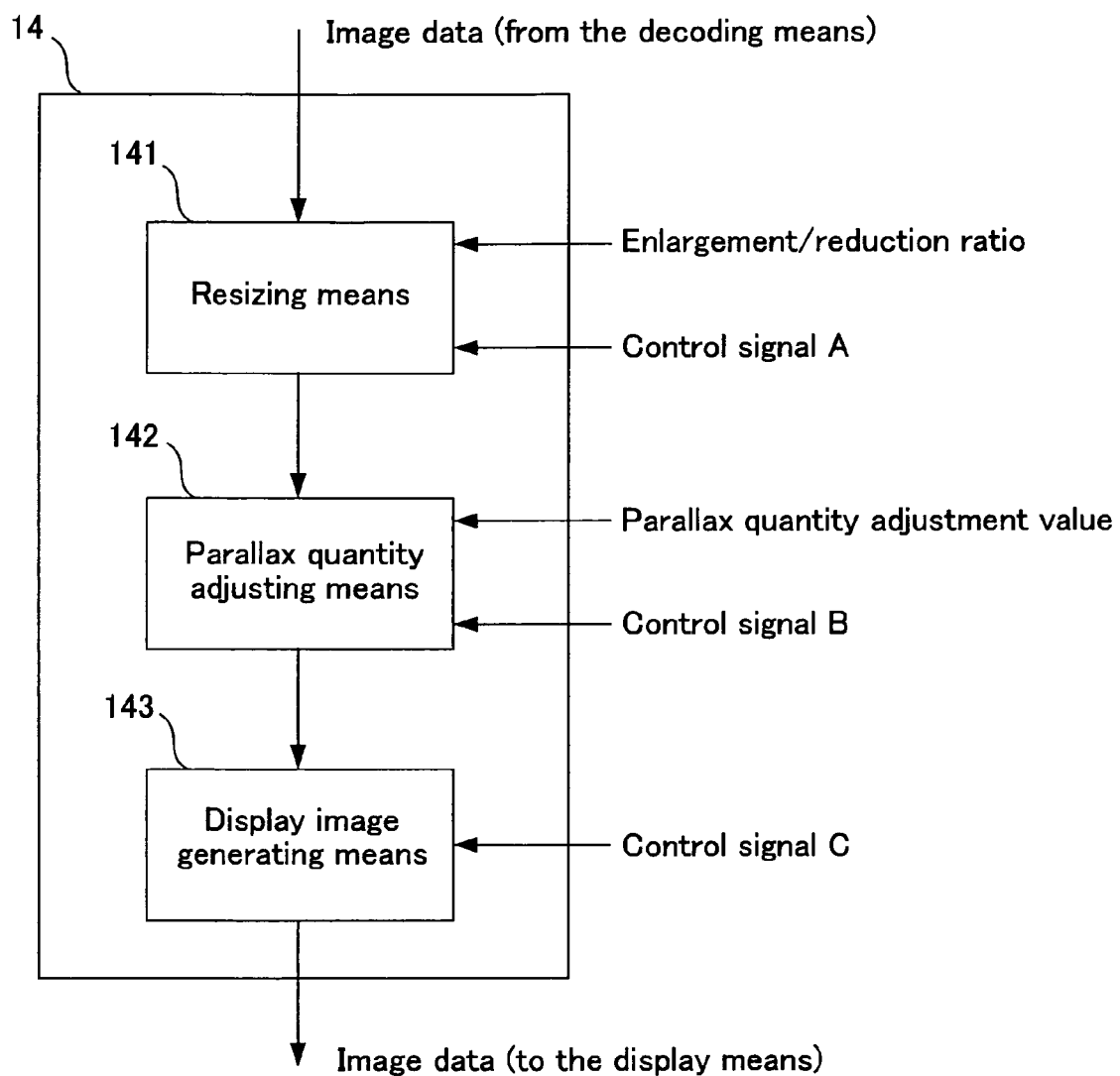
FIG. 2 is a block diagram showing a configurational example of an image processing means of a stereoscopic image reproducing apparatus-according to the first embodiment of the present invention.

Image processing means 14 processes images in frame units of image data. FIG. 2 shows a configurational example of image processing means 14. As shown in FIG. 2, image processing means 14 is composed of a resizing means 141 for enlarging or reducing the size of image data, a parallax quantity adjusting means 142 for adjusting the amount of parallax of three-dimensional images and a display image generating means 143 for converting the images in the display format of display means 15.

Display means 15 is a display apparatus capable of displaying three-dimensional images, and known examples include field-sequential displays, parallax barrier displays and others. In the present embodiment, a case using a parallax barrier display will be described. However, the present invention should not be limited to this and can be applied to other types of display apparatus.

The parallax barrier system will be described with reference to FIG. 3. FIG. 3(a) is an illustration showing the principle of occurrence of parallax in the parallax barrier system, wherein a parallax barrier 302 is placed in front of an image display panel 301. FIG. 3(b) is an illustration showing the display format of the picture displayed in the parallax barrier system, wherein single pixels for left and right eyes are arranged side by side alternately.

In the parallax barrier system, the image shown in FIG. 3(b) is displayed on image display panel 301, and when the image is viewed through a parallax barrier 302 having slits with a width narrower than the distance between pixels corresponding to the same viewpoint, the left-eye image will be viewed by left eye 303 only and right-eye image will be viewed by right eye 304 only, to thereby obtain a stereoscopic vision.

Though not shown in FIG. 1, if the multiplexed data contains audio data, the data is separated by separating means 11 and decoded, then is output from a speaker.

Figure 4:
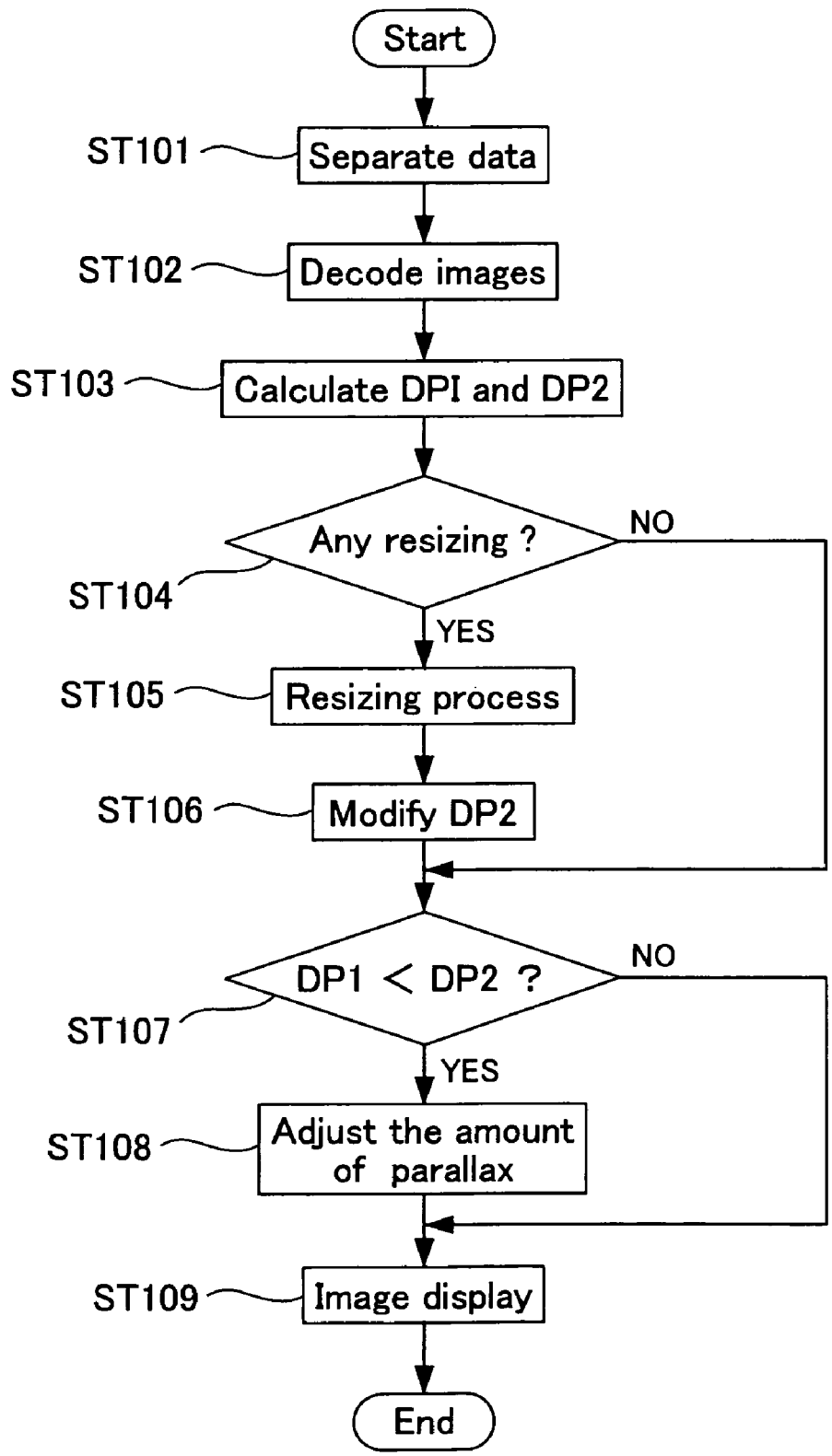
FIG. 4 is a chart showing the flow of the process of a stereoscopic image reproducing apparatus of the first embodiment of the present invention.

The operation of the thus configured stereoscopic image reproducing apparatus 10 will be described with reference to FIG. 4. FIG. 4 is a chart showing the flow of process from when the multiplexed data is supplied to stereoscopic image reproducing apparatus 10 until the image is displayed.

Separating means 11 receives the multiplexed data having image data, audio data and control information multiplexed therein. Separating means 11 separates the input multiplexed data (step ST101).

When the image data, which was separated by separating means 11, has been encoded by a predetermined coding system, decoding means 12 decodes the image data by interpreting the format of the data defined by the coding system (step ST102). Generally, encoded image data is encoded with information of the image data size (image size information, i.e., the number of pixels in one image frame). The image size information of the decoded image data is output to control means 13. Here, the image size information of the image data does not need to be necessarily acquired from decoding means 12 but may be input to control means 13 from other means separately. When the image data has not been encoded, step ST102 can be omitted.

Control means 13 interprets the control information input from separating means 11 and calculates the standard pitch DP1 between dots based on the obtained, standard display size and standard resolution. The control means also calculates the pitch DP2 between dots of display means 15 based on the display size and resolution of display means 15 (step ST103).

The pitch between dots is calculated to be about 0.24 mm when, for example, the size of display means 15 is 12.1 inch and the resolution is 1024×768 dots. Here, upon calculation of the pitch between dots, it may also be possible to consider only the pitch between dots in the horizontal direction because only the horizontal direction is of significance for the binocular parallax.

Figure 8A:
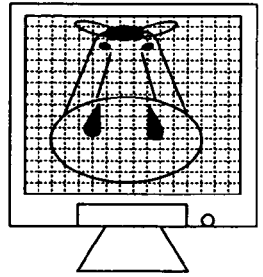
FIG. 8 is an illustration showing examples of display on different display apparatuses.
Figure 8B:
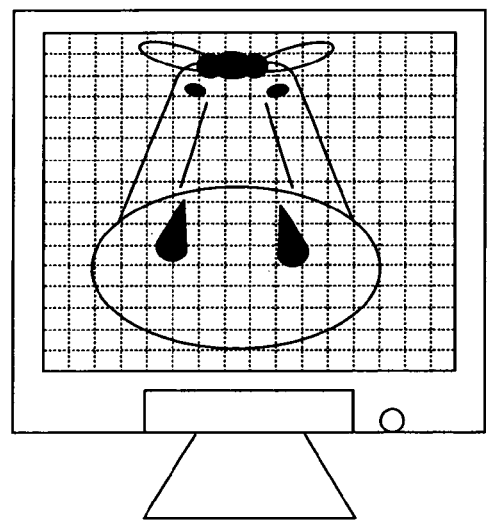
Figure 8C:
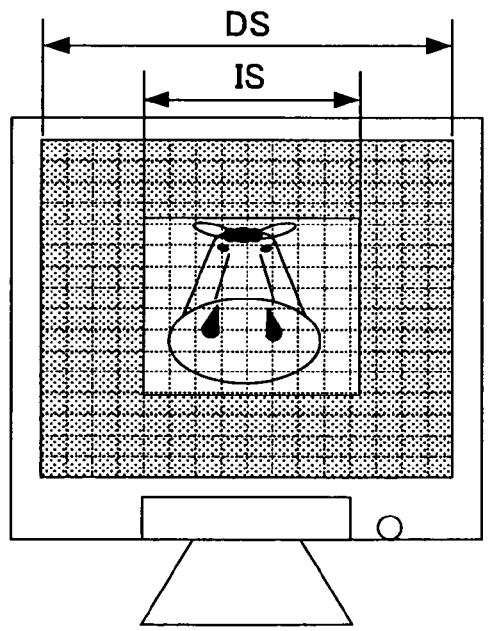

Next, the operation branches depending on whether a resizing process should be needed or not (step ST104). If a resizing process is performed, the operation goes to step ST105. When no resizing process is performed, the operation goes to step ST107. Here, the resizing process means an enlargement process or a reduction process. For example, suppose that the display apparatus shown in FIG. 8(a) is the standard display and the display apparatus shown in FIG. 8(c) is display means 15. In this case, the display size of display means 15 is larger than that of the standard display and its resolution is set to be higher than the standard resolution, so that the image displayed on the full screen of the standard display is displayed partially on the screen of display means 15. In this case, the image data is enlarged so as to be displayed full-screen. When the resolution of display means 15 is lower than that of the standard display, the image data which can be displayed full-screen on the standard display will not suit within the display screen of display portion 15. In this case, reduction in size is performed in order to obtain full-screen display of the image data. Whether presence or absence of a resizing process may have been set previously as an internal flag or may be designated by the user. The presence or absence of a resizing process is input as a control signal A to image processing means 14.

At step ST105, the following process is performed. To begin with, control means 13 calculates the enlargement/reduction ratio from the image size information of the image data and the resolution of display means 15. Here, the calculated ratio between the resolutions of image data with regard to the horizontal direction before and after the resizing process, is used as the enlargement/reduction ratio. This enlargement/reduction ratio is input to image processing means 14, based on which the resizing process is implemented by resizing means 141 of image processing means 14. At step ST106, control means 13 modifies the pitch DP2 between dots by multiplying the pitch DP2 between dots of display means 15 by the aforementioned enlargement/reduction ratio. This is done because the resultant display of the image after enlargement is equivalent to the case where the pitch between dots is magnified.

Control means 13 compares the standard pitch DP1 between dots and the pitch DP2 between dots of display means 15 in size, and determines whether the amount of parallax when the three-dimensional images are displayed on display means 15 is greater than the amount of parallax when the images are displayed on the standard display (step ST107). When DP2 is equal to or smaller than DP1, the amount of parallax is unchanged or becomes small, so that the amount of parallax does not need to be modified, and the operation goes to step ST109. When DP2 is greater than DP1, the amount of parallax becomes large, so that it is determined that the amount of parallax needs to be adjusted, and the operation goes to step ST108. The presence or absence of parallax quantity adjustment process is input as a control signal B to image processing means 14, and parallax quantity adjusting means 142 implements an adjustment process of the amount of parallax (step ST108). At step ST109, control means 13 outputs the type of image data (two-dimensional/three-dimensional) as a control signal C to image processing means 14 and display means 15. If the image data is of three-dimensional images, the data is converted by display image generating means 143 of image processing means 14 into the display format for three-dimensional images in display means 15 and displayed on display means 15.

Referring next to FIG. 5, the parallax quantity adjustment process will be described. FIG. 5 shows in top-down view the ways in three-dimensional images on the display are observed. In FIG. 5(*a*) a pixel R1 for the right-eye image is displayed at a display position 501 and another corresponding pixel L1 for the left-eye image is displayed at a display position 502. These pixels form an image at a position 503 so that the image is observed at position more interior than the display surface.

FIG. 5(*b*) shows a state where the display position of pixel R1 for the right-eye image is shifted left from position 501 to position 504. In this case, the image formed at position 503 is observed at position 505. Since position 505 is located at a point in front of position 503, it is observed to be closer to the display surface. On the contrary, when pixel R1 is shifted right with respect to 501 though unillustrated, the image formed at position 503 will be seen at a position more interior with respect to the display screen.

Figure 7A:
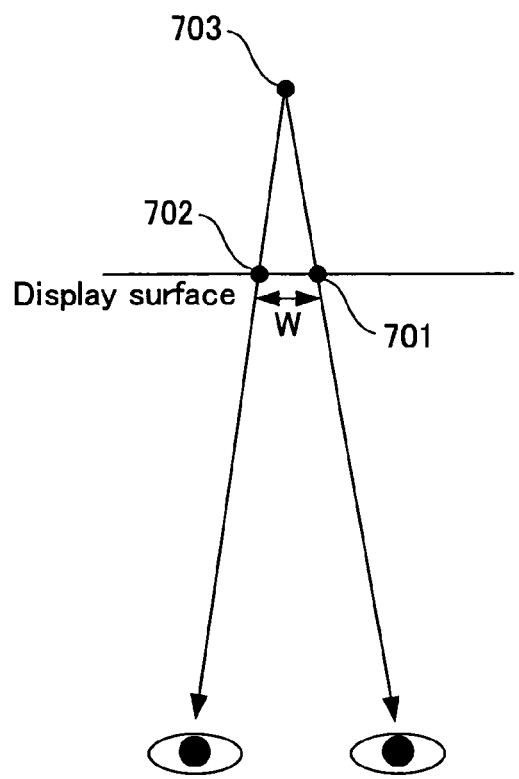
FIG. 7 is an illustration for explaining change in the amount of parallax resulting from enlargement.
Figure 7B:
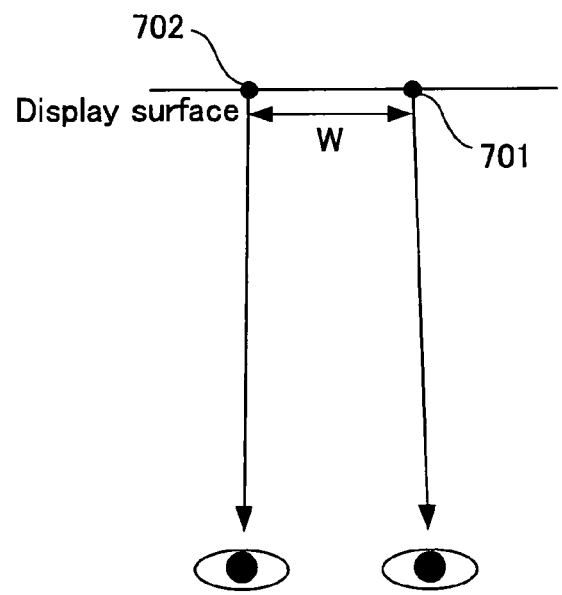

When the amount of parallax is too large as shown in FIG. 7(*b*), the right-eye image is shifted left or the left-eye image is shifted right so as to adjust the amount of parallax. The amount of parallax is the relative distance in the horizontal direction between the corresponding points for left-eye and right-eye images. For example, the relative distance between the display position of pixel R1 in the right-eye image and the corresponding display position of pixel L1 in the left-eye image in FIG. 5 is the very case. In this case, to reduce the amount of parallax, the display position of R1 and the display position of pixel L1 of the left-eye image should be shifted so that the relative distance therebetween becomes smaller. The parallax quantity adjustment value is to designate the amount of shift from the aforementioned position 501 to position 504, and is specified as a predetermined value depending on the ratio between dot pitches DP1 and DP2. Alternatively, both the left and right images may be moved in the opposite directions to each other by half the aforementioned parallax quantity adjustment value.

At this point, the aforementioned process will be described with a supplementary example. Here, a case where a three-dimensional image having a standard display size of 10 inch with a standard resolution of 640×480 dots is reproduced on a stereoscopic image reproducing apparatus having a 12.1 inch display with a resolution of 1024×768 dots will be considered. The standard pitch DP1 between dots and the pitch DP2 between dots in the display apparatus of the stereoscopic image reproducing apparatus are calculated as DP1≈0.32 mm and DP2≈0.24 mm, respectively. If no resizing process is effected, DP1>DP2, hence display is made without adjustment of the amount of parallax.

When a resizing process is effected and the image is enlarged so that it is displayed full-screen, the image data needs to be magnified 1.6 times in both the horizontal and vertical directions. The modified pitch DP2 between dots is calculated as DP2≈0.38 mm. In this case, since DP1<DP2, the amount of parallax should be adjusted.

In the above way, it is possible to solve the problem that the amount of parallax becomes excessively large and the three-dimensional image data is displayed in a state that will not allow for stereoscopic vision, by adaptively adjusting the amount of parallax in accordance with the resolving power of display portion 15.

In the above embodiment, the previously determined value is used as the parallax quantity adjustment value when the parallax quantity adjustment process is effected. However, parallax information such as the maximum amount of parallax in the three-dimensional images, the amount of parallax of the subject of the most importance, or the like may be given as part of control information, and the parallax information can be modified in accordance with the ratio between dot pitches DP1 and DP2.

The above embodiment was described referring to a case where as the information on the resolving power of the standard display used as the standard information, the display size and resolution are contained in the control information. The aforementioned effect can be obtained similarly when the standard pitch between dots and/or number of dots per unit area are contained, instead of the above, in the control information. Alternatively, instead of information as to resolving power, the display size on the standard display may be contained in the control information. In this case, the pitch between dots can be obtained by dividing by the image size information of the image data.

Also, though in the above embodiment the parallax quantity adjustment process is effected at step ST108, the resizing process may be done by using the value of pitch DP2 between dots divided by DP1, as the reduction ratio. Since the amount of parallax will be reduced by downsizing the image data, it is possible to obtain similar effect to that of the aforementioned parallax quantity adjustment process.

Further, though in the above embodiment the enlargement/reduction ratio is determined by calculation, the enlargement/reduction ratio may be determined by user designation. In this case, the amount of parallax is modified in accordance with the designated enlargement/reduction ratio. Moreover, without being limited to the above case, it is possible to provide a means for informing the user of the presence or absence of the resizing process and/or the presence or absence of the parallax quantity adjustment process in control means 13 separately and show the user the fact that the image data has been enlarged or reduced and/or the fact that the amount of parallax has been adjusted, together with the standard display size and the standard resolution. This arrangement allows the user not only to know the presence or absence of the resizing process and the presence or absence of the parallax quantity adjustment process, but also select the desired amount of parallax so as to display the image data based on the desired amount of parallax when there solution is selectable from a plurality of resolutions as in generally widespread personal computers. Thus this provides improvement of convenience.

The Second Embodiment

Next, another embodiment of the present invention will be described. The stereoscopic image reproducing apparatus of the present embodiment receives control information containing parallax information such as the maximum amount of parallax of the three-dimensional images, the amount of parallax of the subject of the most importance and the like, and adjusts the amount of parallax of the three-dimensional images to be displayed on display means 15. Here, the parallax information may be given in dot unit or may be given as an absolute quantity such as a quantity in millimeter unit.

FIG. 6 is a chart showing the flow of operation in this case. In FIG. 6, the processes at step ST201 and step ST202 are the same as those at step ST101 and step ST102 in the previous embodiment, so that description is omitted herein.

Control means 13 calculates the enlargement/reduction ratio from the sizes of the image data before and after the resizing process (step ST203), and calculates the actual amount of parallax by multiplying the a forementioned parallax in formation by that ratio (step ST204). At this point, if the aforementioned input parallax information is given in dot unit, the pitch DP between dots on display means 15 is calculated, so that the parallax information is multiplied by the pitch DP between dots.

Next, the amount of parallax at step ST204 is compared to the predetermined limiting value. If the amount of parallax is greater than the limiting value, the operation goes to step ST206, and if otherwise, the operation goes to step ST207 (step ST205). Here the limiting value is determined within the range in which three-dimensional images can be fused into a stereoscopic image. It is known that if the amount of parallax is greater than the distance between the human eyes, it is difficult to obtain stereoscopic vision. So, the limiting value may be determined to be 6.5 cm, which is the approximate distance between the human eyes.

At step ST206, the enlargement/reduction ratio is limited so that the actual amount of parallax will not exceed the limiting value. The thus calculated enlargement/reduction ratio is output to image processing means 14.

In image processing means 14, a resizing process is performed based on the limited enlargement/reduction ratio (step ST207), and the data is converted into a display format which can be displayed on display means 15 (step ST208). In this way, it is possible to solve the problem that the amount of parallax exceeds the limiting value and the three-dimensional image data is displayed in a state that will not allow for stereoscopic vision, by limiting the enlargement/reduction ratio of the image.

It is also possible to reproduce the image data whose control information contains, in addition to the aforementioned parallax information, the size of the image (in millimeter unit) when the image data is actually displayed on the screen. Also in this case, the amount of parallax will not become greater than the limit by following the specified display size, hence it is possible to solve the problem that three-dimensional image data is displayed in a state that will not allow for stereoscopic vision.

Further, when a means for notifying the user that the enlargement/reduction ratio is limited is provided separately so as to show the user the fact that the enlargement/reduction ratio is limited with a display of the enlargement/reduction ratio, the user is able to display the image data in a desired the enlargement/reduction ratio, referring to this display. Thus this provides improvement of convenience.

Though the embodiments of the present invention have been described heretofore, the stereoscopic image reproducing apparatus of the present invention should not be limited to the above embodiments, and various changes can be made without departing from the scope and sprit of the invention.

INDUSTRIAL APPLICABILITY

In the stereoscopic image reproducing apparatus according to the present invention, since the knowledge of the standard display size and standard resolution can be obtained and the image data can be displayed with a desired amount of parallax, it is possible to widely apply the apparatus to the appliances such as generally widespread personal computers, which can select the resolution from a plurality of resolutions.

The invention claimed is:

1. A stereoscopic image reproducing apparatus for reproducing a three-dimensional image based on control information for controlling a display of three-dimensional image data, comprising:
    a first display portion having a first display size and a first resolution;
    a decision portion for deciding on whether a first amount of parallax on the first display portion after three-dimensional image data has been displayed needs to be changed or not, based on control information; and
    an image processing portion for implementing an image process to the three-dimensional image data for changing the first amount of parallax,
    wherein the control information contains a standard display size and a standard resolution of a standard display portion which is different from the first display portion; and
    wherein the decision portion compares a first pitch between dots determined using the first display size and the first resolution and a standard pitch between dots determined using the standard display size and the standard resolution, and determines that the first amount of parallax needs to be changed only when the first pitch between dots is greater than the standard pitch between dots.

2. A stereoscopic image reproducing apparatus for reproducing a three-dimensional image based on control information for controlling a display of three-dimensional image data, comprising:
a first display portion having a first display size and a first resolution;
a decision portion for deciding on whether a first amount of parallax on the first display portion after three-dimensional image data has been displayed needs to be changed or not, based on control information; and
an image processing portion for implementing an image process to the three-dimensional image data for changing the first amount of parallax,
wherein the control information contains a standard pitch between dots of a standard display portion which is different from the first display portion; and
wherein the decision portion compares a first pitch between dots determined using the first display size and the first resolution and the standard pitch between dots, and determines that the first amount of parallax needs to be changed only when the first pitch between dots is greater than the standard pitch between dots.

3. A stereoscopic image reproducing apparatus for reproducing a three-dimensional image based on control information for controlling a display of three-dimensional image data, comprising:
a first display portion having a first display size and a first resolution;
a decision portion for deciding on whether a first amount of parallax on the first display portion after three-dimensional image data has been displayed needs to be changed or not, based on control information; and
an image processing portion for implementing an image process to the three-dimensional image data for changing the first amount of parallax,
wherein the control information contains number of dots per unit area of a standard display portion which is different from the first display portion; and
wherein the decision portion compares a first pitch between dots determined using the first display size and the first resolution and a standard pitch between dots determined using the number of dots per unit area, and determines that the first amount of parallax needs to be changed only when the first pitch between dots is greater than the standard pitch between dots.

4. A stereoscopic image reproducing apparatus for reproducing a three-dimensional image based on control information for controlling a display of three-dimensional image data, comprising:
a first display portion having a first display size and a first resolution;
a decision portion for deciding on whether a first amount of parallax on the first display portion after three-dimensional image data has been displayed needs to be changed or not, based on control information; and
an image processing portion for implementing an image process to the three-dimensional image data for changing the first amount of parallax,
wherein the control information contains a standard image size of the three-dimensional image data displayed on a standard display portion which is different from the first display portion; and
wherein the decision portion compares a first pitch between dots determined using the first display size and the first resolution and a standard pitch between dots determined using the standard image size, and determines that the first amount of parallax needs to be changed only when the first pitch between dots is greater than the standard pitch between dots.

5. The stereoscopic image reproducing apparatus according to claim 1, wherein the first pitch between dots has been modified by an enlargement/reduction ratio determined using an image size of the three-dimensional image data and the first resolution.

6. The stereoscopic image reproducing apparatus according to claim 2, wherein the first pitch between dots has been modified by an enlargement/reduction ratio determined using an image size of the three-dimensional image data and the first resolution.

7. The stereoscopic image reproducing apparatus according to claim 3, wherein the first pitch between dots has been modified by an enlargement/reduction ratio determined using an image size of the three-dimensional image data and the first resolution.

8. The stereoscopic image reproducing apparatus according to claim 4, wherein the first pitch between dots has been modified by an enlargement/reduction ratio determined using the image size of the three-dimensional image data and the first resolution.

9. A stereoscopic image reproducing apparatus for reproducing a three-dimensional image based on control information for controlling a display of three-dimensional image data, comprising:
a first display portion for displaying three-dimensional image data;
a decision portion for deciding on whether an image size of the three-dimensional image data needs to be changed or not, based on control information; and
a resizing portion for changing the image size of the three-dimensional image data based on the result of the deciding in the decision portion;
wherein the control information contains a standard amount of parallax of a three-dimensional image; and
wherein only when a first amount of parallax on the first display portion after the three-dimensional image data has been displayed will be greater than the standard amount of parallax, the decision portion determines that the image size needs to be changed.

10. The stereoscopic image reproducing apparatus according to claim 9, wherein the standard amount of parallax is the maximum amount of parallax of the three-dimensional image data.

11. The stereoscopic image reproducing apparatus according to claim 9, wherein the standard amount of parallax is an amount of parallax of a predetermined subject in the three-dimensional image.

12. A stereoscopic image reproducing method for reproducing a three-dimensional image based on control information for controlling a display of three-dimensional image data, comprising:
a decision step for deciding on whether a first amount of parallax on a first display portion after three-dimensional image data has been displayed needs to be changed or not, based on control information; and
an image processing step for implementing an image process to the three-dimensional image data for changing the first amount of parallax,
wherein the control information contains a standard display size and a standard resolution of a standard display portion which is different from the first display portion; and wherein the decision step has:
- a comparison step for comparing a first pitch between dots determined using the first display size and the first resolution and a standard pitch between dots determined using the standard display size and the standard resolution, and
- a decision step for determining that the first amount of parallax needs to be changed only when the first pitch between dots is greater than the standard pitch between dots.

13. A stereoscopic image reproducing method for reproducing a three-dimensional image based on control information for controlling a display of three-dimensional image data, comprising:
- a decision step for deciding on whether a first amount of parallax on a first display portion after three-dimensional image data has been displayed needs to be changed or not, based on control information; and
- an image processing step for implementing an image process to the three-dimensional image data for changing the first amount of parallax,
- wherein the control information contains a standard pitch between dots of a standard display portion which is different from the first display portion; and
- wherein the decision step has:
  - a comparison step for comparing a first pitch between dots determined using the first display size and the first resolution and the standard pitch between dots, and
  - a decision step for determining that the first amount of parallax needs to be changed only when the first pitch between dots is greater than the standard pitch between dots.

14. A stereoscopic image reproducing method for reproducing a three-dimensional image based on control information for controlling a display of three-dimensional image data, comprising:
- a decision step for deciding on whether a first amount of parallax on a first display portion after three-dimensional image data has been displayed needs to be changed or not, based on control information; and
- an image processing step for implementing an image process to the three-dimensional image data for changing the first amount of parallax,
- wherein the control information contains number of dots per unit area of a standard display portion which is different from the first display portion; and
- wherein the decision step has:
  - a comparison step for comparing a first pitch between dots determined using the first display size and the first resolution and a standard pitch between dots determined using the number of dots per unit area, and
  - a decision step for determining that the first amount of parallax needs to be changed only when the first pitch between dots is greater than the standard pitch between dots.

15. A stereoscopic image reproducing method for reproducing a three-dimensional image based on control information for controlling a display of three-dimensional image data, comprising:
- a decision step for deciding on whether a first amount of parallax on a first display portion after three-dimensional image data has been displayed needs to be changed or not, based on control information; and
- an image processing step for implementing an image process to the three-dimensional image data for changing the first amount of parallax,
- wherein the control information contains a standard image size of the three-dimensional image data displayed on a standard display portion which is different from the first display portion; and
- wherein the decision step has:
  - a comparison step for comparing a first pitch between dots determined using the first display size and the first resolution and a standard pitch between dots determined using the standard image size, and
  - a decision step for determining that the first amount of parallax needs to be changed only when the first pitch between dots is greater than the standard pitch between dots.

16. The stereoscopic image reproducing method according to claim 12, wherein the first pitch between dots has been modified by an enlargement/reduction ratio determined using an image size of the three-dimensional image data and the first resolution.

17. The stereoscopic image reproducing method according to claim 13, wherein the first pitch between dots has been modified by an enlargement/reduction ratio determined using an image size of the three-dimensional image data and the first resolution.

18. The stereoscopic image reproducing method according to claim 14, wherein the first pitch between dots has been modified by an enlargement/reduction ratio determined using an image size of the three-dimensional image data and the first resolution.

19. The stereoscopic image reproducing method according to claim 15, wherein the first pitch between dots has been modified by an enlargement/reduction ratio determined using an image size of the three-dimensional image data and the first resolution.

20. A stereoscopic image reproducing method for reproducing a three-dimensional image based on control information for controlling a display of three-dimensional image data, comprising:
- a decision step for deciding on whether an image size of three-dimensional image data needs to be changed or not, based on control information; and
- a resizing step for changing an image size of three-dimensional image data based on the result of the deciding in the decision step;
- wherein the control information contains a standard amount of parallax of a three-dimensional image; and
- wherein only when a first amount of parallax on the first display portion after the three-dimensional image data has been displayed will be greater than the standard amount of parallax, the decision step determines that the image size needs to be changed.

21. The stereoscopic image reproducing method according to claim 20, wherein the standard amount of parallax is the maximum amount of parallax of the three-dimensional image data.

22. The stereoscopic image reproducing method according to claim 20, wherein the standard amount of parallax is an amount of parallax of a predetermined subject in the three-dimensional image.

* * * * *